Patented Aug. 14, 1923.

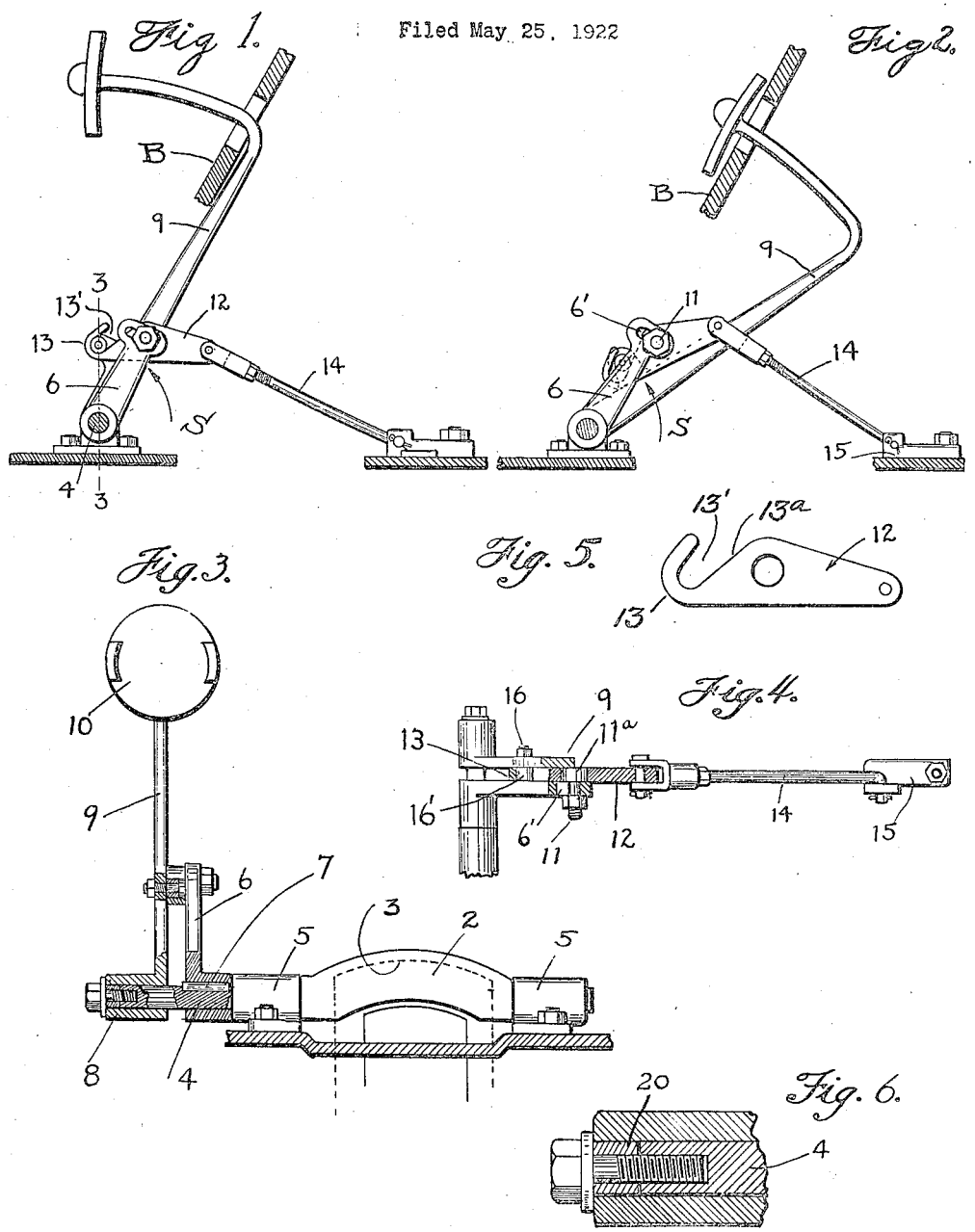

1,464,905

UNITED STATES PATENT OFFICE.

EMIL S. GRAFENSTATT, OF LOS ANGELES, CALIFORNIA.

CLUTCH PEDAL.

Application filed May 25, 1922. Serial No. 563,647.

*To all whom it may concern:*

Be it known that I, EMIL S. GRAFENSTATT, a citizen of the United States, residing at Los Angeles, in the county of Los Angeles and State of California, have invented new and useful Improvements in Clutch Pedals, of which the following is a specification.

This invention relates to clutch pedal operating means and is an improvement in the type of mechanism shown in my application filed April 18, 1922, Serial No. 555,454.

In the above mentioned application the mechanism consists of a compound lever, and in the present invention a compound lever is also utilized.

An object is to provide a form of clutch pedal mechanism in which the ease of applying and releasing the clutch may be readily accomplished and therefore will eliminate the sudden application of the driving power when the clutch is being set for driving position.

Other objects will be made manifest in the following specification of an embodiment of the invention illustrated in the accompanying drawings, in which—

Figure 1 is a side elevation of the improved mechanism showing the clutch pedal in the released and clutch closing position.

Fig. 2 is a similar view showing the mechanism in the clutch releasing position.

Fig. 3 is an elevation and partial section in a plane at right angles to that of Fig. 1.

Fig. 4 is a plan and partial sectional view of the device.

Fig. 5 is a side elevation of the cam lever.

Fig. 6 is a detail of the spacing device for fastening the pedal lever in position.

A portion of a clutch train is indicated as comprising a bowed crank arm 2 designed to engage a complementary shifting member 3, shown in dotted lines, of a clutch of the cone type. The bow is rigidly fixed to a substantial rock shaft 4 mounted in suitable bearings 5, and upon one end of the rock shaft there is arranged a short lever 6 which may be keyed or otherwise attached at 7 to the shaft.

Beyond the lever 6 there is provided a hub 8 which is loose on the shaft and carries an extended lever 9 having a pedal 10 at its outer end. This is exposed in front of the dash board B of the vehicle with which the clutch may be associated.

The pedal 9 is designed to have a slight degree of independent motion on the rock shaft 4 and with respect to the clutch lever 6. This latter is normally pressed in the direction of the arrow S, Figs. 1 and 2, by a spring forming a portion of the clutch mechanism.

To disengage the clutch, the rock shaft must be turned in a direction opposite to that indicated by the arrow S as the clutch is normally thrown into engaged position by the spring referred to.

To effect the operation of the clutch lever 6, this is shown as having at its upper end a pivot pin or bolt 11 extending transversely, and it may be adjusted in a slot 6' at the end of the lever to provide for take up of wear in the clutch parts, the pivot pin has on one end a disc head 11ª set tight on the lever, and upon this head is pivoted a cam lever having a forwardly extending arm 12 and a rearwardly extending arm 13. The arm 12 is shown as attached by a link 14 to a fixed part 15 suitably disposed. The arm 13 of the lever is slidably attached to the contiguous portion of a pedal lever 9 as by means of a pin 16 fastened in the lever 9 and having a roller 16'. The end 13 of the lever member 12 is provided with a slot or aperture 13' having a cam wall 13ª which in the normal clutch closing position of the pedal 9 rests at an angle of about 45° to the vehicle, as is clearly shown in Fig. 1.

The roller 16' on the pin 16 plays in the cam slot 13' of the lever arm 13 and forms by engagement with the walls of the cam slot, the connection between the lever 9 and the lever arm 13, and this forms connection with the short lever arm 6 as above described.

In the normal operation of the compound lever just described, the yielding clutch arm 6 being thrown upwardly and rearwardly to the position of Fig. 1, throws the lever arm 12—13 to a substantially horizontal position in which it is limited by the link 14; at which time the lever arms 6 and 9 lie in substantially the same plane along the rock shaft 4.

In this position of the lever parts, the clutch is engaged by the action of the actuating bow portion 2 of the rock shaft 4. To disengage the clutch it is necessary to repress the clutch lever 6 and only a slight degree of movement of this lever is necessary to accomplish the disconnection. Disconnection is secured by pressing the pedal 9 downwardly to the position shown in Fig. 2. The downward movement of this lever results in a rocking of the lever member 12—13 on its fulcrum pin 11 (in the end of lever 6). Concurrently with this rocking the link 14 and the arm 12 are thrown upward and this results in a shortening of the distance between the pin 11 and the pivot bracket 15 and causes the lever 6 to be thrown forwardly a sufficient distance to disengage the clutch.

During the depression of the pedal lever 9, the cam roller 16' slides in the cam slot 13' to compensate for the differential movement of the lever 9 and the lever 6.

Ordinarily, when the clutch is engaged, the release of foot pressure from the usual pedal results in a sudden connection of the clutch parts with undesirable results well known. This is obviated by the present device, since as the foot is released on the pedal 9 this has an initial upward movement with a differential slower upward movement of the clutch lever 6, and this latter, therefore, throws the clutch into engagement with a slower action.

The lever arms 6 and 9 are in the present organization suitably spaced on the rock shaft 4 to provide for the insertion therebetween of the lever 12—13 in order to obviate alterations and changes of any of the parts of the standard construction utilizing levers such as 6 and 9. The present invention includes a spacing bushing 20 adapted to be slipped onto the shank of the usual fastening cap screw which is screwed into the end of the shaft 4. The length of the bushing 20 is substantially equal to the distance that the levers 6 and 9 are spaced from each other. This construction obviates the twisting or bending of the levers and provides at the same time a simple, practicable and substantial assembly of elements.

Various modifications and changes may be resorted to within the spirit of the invention as claimed.

What is claimed is:

1. A motor clutch lever structure, comprising, in combination, a rock shaft for engaging and disengaging clutch members, a pedal loosely mounted on said rock shaft, a clutch lever secured on the rock shaft, and a cam lever mounted on the clutch lever and having one arm attached to the pedal and one arm attached to a fixed support, whereby, when the pedal is pressed, a differential movement is imparted to the clutch lever by means of the cam lever.

2. In a motor clutch lever structure, a rock shaft provided with a fixed clutch lever arm and a movable pedal arm arranged adjacent to the clutch arm, and a lever having a cam part and being mounted on one of said levers and a cam roller mounted on the other lever and operating in the cam lever.

3. In a motor clutch lever structure, a rock shaft provided with a fixed clutch lever arm and a movable pedal arm arranged adjacent to the clutch arm, and a lever having a cam part and being mounted on one of said levers and a cam roller mounted on the other lever and operating in the cam lever, one end of the cam lever being linked to a fixed part whereby the cam lever will oscillate when the pedal lever is depressed and released.

4. In a motor clutch lever structure, a rock shaft provided with a fixed clutch lever arm and a movable pedal arm arranged in spaced relation from and adjacent to the clutch arm, a cam member interposed between the levers, and a fastening means including a screw and a bushing part thereon, the latter insertable into the hub of one of the levers and said screw entering the contiguous end of said shaft, the bushing having a length substantially equal to the distance that the levers are spaced from each other.

In testimony whereof I have signed my name to this specification.

EMIL S. GRAFENSTATT.